United States Patent [19]

Giguere

[11] 3,723,759

[45] Mar. 27, 1973

[54] INTERFACE CIRCUIT

[76] Inventor: Irving J. Giguere, 383 Middle St., Bristol, Conn. 06010

[22] Filed: Apr. 26, 1971

[21] Appl. No.: 141,057

[52] U.S. Cl. ....................307/203, 307/213, 307/264

[51] Int. Cl. ....................H03k 19/12

[58] Field of Search......307/237, 203, 264, 290, 213; 328/196, 206

[56] References Cited

UNITED STATES PATENTS

| | | | |
|---|---|---|---|
| 3,092,729 | 6/1963 | Cray | 307/237 |
| 3,151,256 | 9/1964 | Simon | 307/290 |
| 3,422,282 | 1/1969 | Orrell | 307/237 |
| 3,400,277 | 9/1968 | Bruckner | 307/264 |
| 3,302,037 | 1/1967 | Neumann | 307/290 |
| 3,305,731 | 2/1967 | Welsh | 307/264 |
| 3,294,981 | 12/1966 | Bose | 307/290 |

*Primary Examiner*—James W. Lawrence
*Assistant Examiner*—Harold A. Dixon
*Attorney*—Johnson & Kline

[57] ABSTRACT

A circuit for rendering a binary source signal applied to the input of a TTL integrated circuit non-inverting gate to have the characteristics required by the gate for faultless operation as to voltage value and speed of change by a voltage dividing network and a feedback line from the output to the input of the gate. The gate input voltage is also clamped at high and low voltages.

3 Claims, 3 Drawing Figures

PATENTED MAR 27 1973

3,723,759

INVENTOR

Irving J. Giguere

BY

Johnson and Kline

ATTORNEYS

INTERFACE CIRCUIT

In many electrical devices, information in the form of binary states is processed by a logic circuit to achieve an effect dependent on the input information. A logic circuit may include many components that are interrelated and which may be discrete or individual, however, there has been an increasing use of integrated circuits which combine many components into one physical entity. One form or family of integrated circuits is known as transistor to transistor or TTL logic and may generally include a plurality of fast acting switching units called gates. The gates process information binarily by having either one or the other of two states with one state being a 0 state and the other being a 1 state. It has been essentially standardized that a 0 state will have the gate output at an essentially zero voltage level while for a 1 state, the output voltage level will be at least +3 to perhaps +5 volts D.C.

The standardized condition for the binary states enables the information to be freely transferable as to voltage level within the circuits. Moreover, when a gate is shifted from one state to another, its shift with respect to time is such as to be compatible with the input of another gate so as to effect faultless transfer of the information. If, however, input information to a gate does not have the standardized binary voltage or shifts too slowly, then the information may tend to cause the gate to malfunction and/or be destroyed. Thus difficulty has been experienced when input information in the form of binary voltage levels is derived from other sources, such as component circuits, mechanical devices, i.e., switches, etc., and which is applied to TTL integrated circuits for processing.

It has been suggested that special interface circuits be interposed between the input information and the TTL gates to render the input information as to voltage and speed of change compatible to the TTL gate requirements to effect errorless transfer. One suggestion has been to utilize two different gates on the TTL circuit and to interconnect them as a Schmitt trigger with their output being the input utilized. However, this suggestion, while apparently workable, has not been found to be completely satisfactory as it is relatively uneconomical, especially in its inefficient use of gates on the TTL circuit.

It is accordingly an object of the present invention to provide an interface circuit that is interconnected between a TTL integrated circuit gate and a source of binary input information which renders the input information compatible with the requirements of the gate to effect faultless transfer of the information by the gate.

Another object of the present invention is to achieve the above object with a circuit that is positively acting over a wide range of input information, relatively noise immune and prevents the input information from exceeding with tolerances of the TTL logic gate.

A further object of the present invention is to provide an interface circuit for use with a non-inverting TTL integrating circuit gate which while achieving the above objects is economical, composed of few parts and which may be easily incorporated into systems using TTL integrated circuits.

In carrying out the present invention, the interface circuit is interconnected between the source of binary information and the input of a TTL integrated circuit gate to which the information is to be transferred. The interface circuit includes a pair of resistors which form a voltage divider to cause only a proportion of the source voltage from being applied to the input terminals. Additionally, one way valves are connected to the gate input and to D.C. potentials to limit or clamp the 0 state voltage at the input to just slightly below zero voltage and to just slightly above +3 volts D.C. for the 1 state, which levels are within the tolerance range of the gate to which the source signal is applied.

The time for shifting the voltage level of the source signal from one state to another is generally much greater than the time required for the gate to shift its output from a corresponding state to the other. The value of the voltage at the gate when the gate shifts is called the threshold voltage and has one value for an increasing input voltage and a higher value for a decreasing input voltage. For values of gate input voltage between these two threshold voltages, the gate is uncertain as to which state to achieve and hence is called the unstable or threshold region. Accordingly, as the source voltage, in shifting from one state to another, achieves a value which has its proportion applied to the gate input by the voltage divider be at the threshold value, the gate rapidly shifts its state. However, as the gate input voltage may rise slower in the unstable region than the time for the gate to shift, the gate is placed in its condition of instability where it may oscillate between its two states.

To positively accelerate the value of the voltage at the gate input past the unstable region range, the interface circuit includes a feedback line from the gate output to its input. This line places the gate input voltage immediately above the unstable region and hence obviates ill-effects caused by a slowly shifting source signal. It will be understood that in the present embodiment, the feedback voltage and the source voltage are both shifting in the same direction and thus it is required that the TTL gate be of the non-inverting type.

Other features and advantages will hereinafter appear.

Referring to the drawing.

Figure 1:
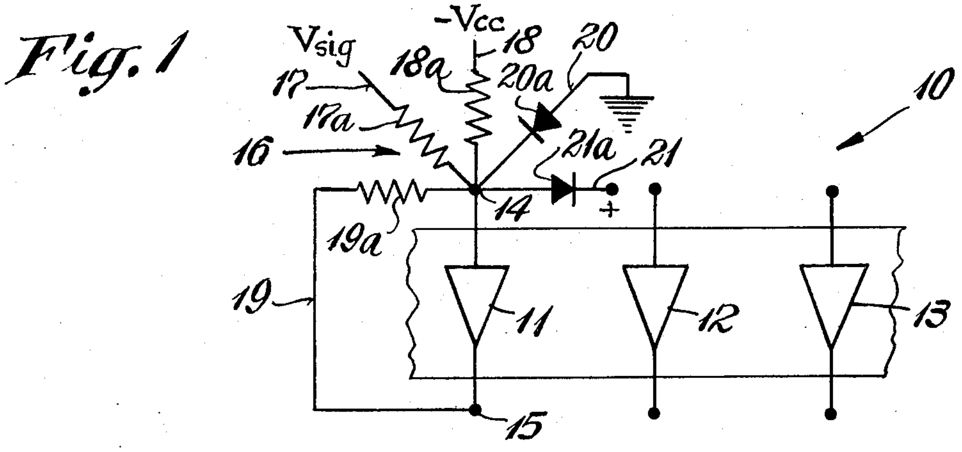
FIG. 1 is an electrical schematic and diagrammatic view of the present invention shown applied to a TTL non-inverting integrated circuit gate.

Referring to the drawing, a portion of a transistor to transistor integrated circuit is generally indicated by the reference numeral 10 and has a plurality of non-inverting gates, with three gates 11, 12 and 13 being shown. Each of the gates has at least an input and an output with the input for the gate 11 being indicated by the reference numeral 14 and its output indicated by the reference numeral 15. While each of the gates is shown as having separate inputs and outputs it will be understood that they may be internally interconnected together if desired but with respect to the gate 11, both its input and output terminals are accessible. The output terminal 15 may be connected to other logic circuits (not shown).

The interface circuit of the present invention is indicated by the reference numeral 16 and includes a first lead 17 having a resistance 17*a* connected to the input 14. The lead 17 has applied thereto the binary information from the source and is designated $V_{sig}$. Also connected to the input 14 is a lead 18 having a resistor 18*a* with lead 18 being connected to a negative source of D.C. power indicated by the representation $-V_{cc}$. A third lead 19 is connected between the gate output 15 through a resistor 19*a* to the input 14. In addition, a lead 20 through a diode 20*a* connects the input 14 to ground which has 0 potential. A lead 21 connects through a diode 21*a* a +5 volt D.C. power source to the input terminal 14.

In the operation of the circuit with the value of the $V_{sig}$ on the lead 17 being essentially at ground voltage level for a 0 binary state, the gate 11 has its output 15 also at a ground voltage level. The input terminal 14, however, is slightly negatively biased by an amount that approximates the voltage drop in the diode 20*a* as this diode causes any negative voltage, either from lead 18 or the source lead 17, greater than its diode drop to pass through to ground. Thus for a 0 binary state on the lead 17, the value of the potential at the input terminal is maintained slightly less than ground and is not permitted to negatively exceed this value.

Upon the value of the $V_{sig}$ changing to its other state which must be a positive voltage greater than the upper threshold voltage and conveniently may be 15 volts, the voltage at the gate input 14 will rise proportionately therewith with the proportion depending upon the values of the resistors 17*a* and 18*a* and the value of the negative source $V_{cc}$. At some voltage value on the lead 17 generally about midway between the values of $V_{sig}$ for its 0 and 1 states, the input 14 will have a positive voltage of approximately 1.4 volts which is the threshold voltage of the gate 11 at the lower end of the unstable region. This will cause the gate 11 to conduct to assume a 1 state and have the gate output 15 be placed at at least slightly above +3 volts. The output voltage level is shifted from 0 to +3 volts almost instantaneously (nano seconds) and the interface circuit causes the gate input 14 to have most of the +3 voltage instantaneously impressed thereat by conduction through the lead 19 and resistor 19*a*.

The gate input terminal voltage accordingly is shifted immediately to about +2 volts almost simultaneously with the change in the output 15 voltage and maintained thereat until raised by $V_{sig}$. Thus as soon as the output of the gate 11 attains the 1 state, its input voltage is raised beyond the unstable region (+1.4 volts to 1.7 volts typically) irrespective of the time that the value of $V_{sig}$ requires to pass through the unstable voltage region.

The $V_{sig}$ voltage will continue to rise to its value representative of the binary state of 1 with the proportion being applied to the input 14. However, any positive voltage at the input greater than +5 volts plus the voltage drop in the diode 21*a* is prevented from being applied to the input 14 by conduction of the diode 21*a*. The gate 11 is thus protected against any higher positive voltage which may harm it. Moreover, the maintenance of the output 15 at slightly above +3 volts also maintains the input terminal at about +3 volts which is above the threshold range even though there may be some variations in the voltage level of the $V_{sig}$ thereby assuring that a continuous effective 1 stage voltage is impressed on the input 14.

For this situation when the gate 11 is conducting and the output 15 has a 1 state and the $V_{sig}$ voltage level changes from a binary 1 to a binary 0, the value of the voltage at the input 14 will decrease depending upon the voltage dividing effect of the resistors 17*a* and 18*a* and the limiting effect of the resistor 19*a* until it reaches the value at the upper level of the threshold range (1.7 volts typically) causing the gate 11 to assume the 0 state. Upon this occurring, the voltage at the output 15 decreases to ground, and through the lead 19 and resistor 19*a*, causes the voltage at the input 14 to also instantaneously be placed at a ground potential and maintained there as $V_{sig}$ decreases to ground for its binary 0 state.

Figure 2:
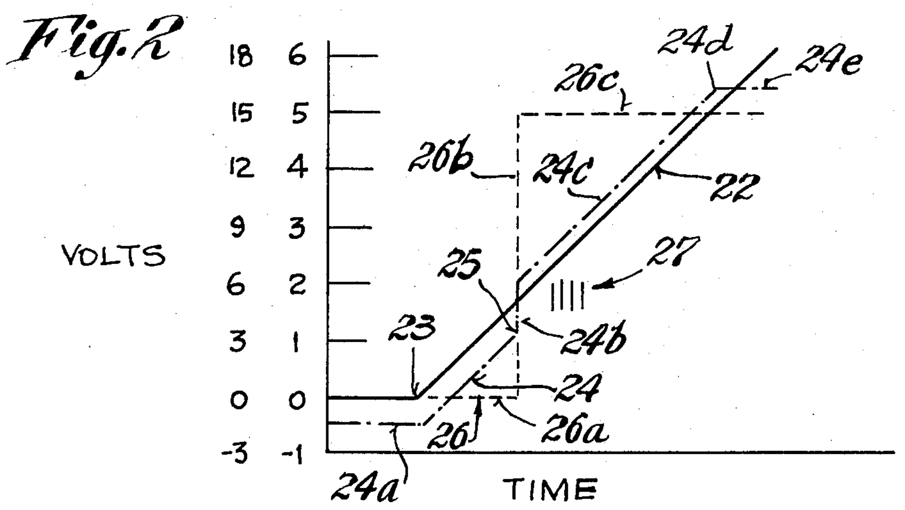
FIG. 2 is a representation of various voltages with respect to time for a change in a binary state from a low voltage level to a high voltage level.

Referring to FIG. 2, which is a representation of various voltages versus time, the value of the $V_{sig}$ voltage is shown as a solid line 22 and changes from its 0 state to its 1 state with the change beginning at the point 23. The values of −3 to 18 volts on the ordinate relate solely to $V_{sig}$ voltage as in this embodiment it is assumed that $V_{sig}$ binary 0 voltage is zero volts and binary 1 voltage is greater than 15 volts. The voltage dividing network is set to apply about one-third of the $V_{sig}$ voltage value of the gate input 14. The value of the voltage at the gate input is shown by a dot-dash line 24 and is initially slightly below ground (24*a*) and corresponds essentially with the proportion of $V_{sig}$ from point 23 until a threshold point 25 is attained. The gate input voltage then increases almost instantaneously (24*b*) to about 2 volts and changes proportionately (24*c*) with $V_{sig}$ until $V_{sig}$ at the gate input attains a value of 5½ volts (24*d*) where it is held by diode 21*a* (24*e*). The output 15 voltage (dashed line 26) remains essentially at 0 volts (26*a*) until threshold point 25 occurs when it instantaneously rises (26*b*) to about +5 volts where it remains (26*c*).

It will be understood that the threshold range may vary about a range of perhaps ½ volts at the input 14 and without the present interface circuit, a slow rising $V_{sig}$, could cause the state of the gate 11 to oscillate as pictured by the group of lines 27.

Figure 3:
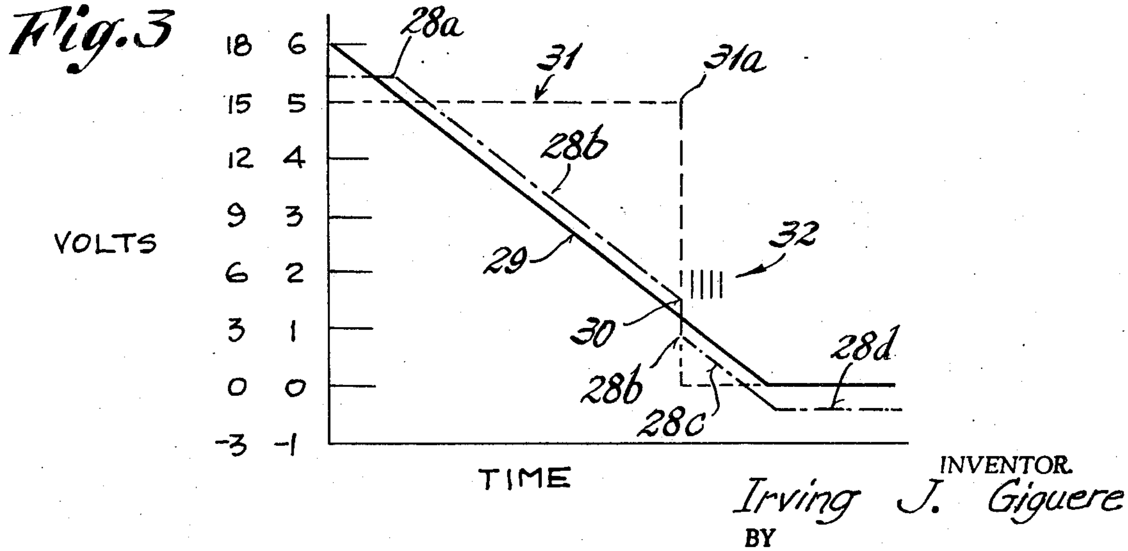
FIG. 3 is a representation similar to FIG. 2 for the change of a binary state from a high voltage level to a low voltage level.

The change in $V_{sig}$ from binary 1 to binary 0, or from +15 volts to 0 volts, is represented in FIG. 3 where the value of voltage at the input is about 5½ volts (28*a*) and which changes proportionately with the value of $V_{sig}$ (solid line 29) until the threshold point 30 is reached. It then drops almost instantaneously to about 1 volt (28*b*) where it changes proportionately with $V_{sig}$ (28*c*) to its value of slightly below ground (28*d*). The voltage at the output 15 (line 31) changes almost instantaneously from +5 volts (31*a*) to ground at the time of the crossing of the threshold voltage point by the input 14 voltage value. Again a group of lines 32 show where oscillation would occur over the threshold range for a slowly decreasing value of $V_{sig}$.

The threshold point may vary somewhat between different gates and also the extent of the threshold range, however, the present interface circuit causes the voltage at the gate input to quickly shift beyond the threshold range as soon as the gate has assumed the desired binary state. Accordingly, at the first shift of the gate, the input 14 voltage is made to accelerate beyond the threshold range faster than the gate could oscillate to the previous binary state thereby obviating the tendency of the gate to malfunction for slowly changing input voltages within the threshold range.

Though it is presently known that the components of the interface circuit may be discrete components, it is also contemplated that they may be incorporated together as a unitary integrated circuit.

It will be understood that there has been disclosed a simple effective circuit composed of few parts which may be interposed between a source of binary information and the input to a TTL integrated circuit gate to render the binary information compatible with the requirements for faultless operation of the TTL gate. The circuit provides for applying only a portion of the binary source voltage to the gate input and also provides for maintaining the voltage signal within a range that the gate can tolerate.

Variations and modifications may be made within the scope of the claims and portions of the improvements may be used without others.

I claim:

1. An interface circuit for use with a transistor to transistor integrated circuit having a fast switching gate formed to have an input and an output and having an unstable region for selected values of voltages at the gate input, said gate providing binary information in the form of one of two different binary voltage levels at its output, and source mans having a lead for supplying binary information in the form of one of two voltage levels to the input with the gate output shifting its binary information as the source binary information on the lead shifts to maintain correlation therebetween, said interface circuit including a voltage divider having an end connected to the source means lead and another end connected to a D.C. source with an intermediate portion connected to the gate input and means for supplying a positive feedback voltage from the gate output to the gate input and in which there are means for preventing the value of the voltage at the gate input from substantially exceeding the values of voltage applied at the gate input required for the two different binary states.

2. The invention as defined in claim 1 in which the preventing means includes a fourth lead connecting a ground through a forwardly directed diode to the gate input whereby for essentially ground and negative values of the voltage of the source means lead, a slightly negative voltage is maintained on the gate input.

3. The invention as defined in claim 1 in which the gate is a non-inverting gate with correspondence between the source binary information and the gate output binary information with the voltage from the source means and the voltage from the gate output changing in the same direction and in which the positive voltage supplying means includes a resistance means connected between the gate output and the gate input.

* * * * *